United States Patent [19]

Barnes

[11] 4,314,910
[45] Feb. 9, 1982

[54] LUMINISCENT MATERIALS

[76] Inventor: Roderick G. L. Barnes, 45 Flambards Close, Meldreth, near Royston, Hertfordshire, England, SG8 6JX

[21] Appl. No.: 123,771

[22] Filed: Jan. 20, 1980

Related U.S. Application Data

[63] Continuation-in-part of Ser. No. 7,729, Jan. 30, 1979, abandoned, which is a continuation of Ser. No. 826,749, Aug. 22, 1977, abandoned.

[30] Foreign Application Priority Data

Sep. 3, 1976 [GB] United Kingdom ............... 38615/76

[51] Int. Cl.$^3$ ............................................. C09K 11/463
[52] U.S. Cl. ............................... 252/301.4 R; 313/468
[58] Field of Search ................. 252/301.4 R; 313/467, 313/468

[56] References Cited

FOREIGN PATENT DOCUMENTS 2739437 3/1978 Fed. Rep. of Germany .
46-20471 6/1971 Japan ............................ 252/301.4 R

OTHER PUBLICATIONS

Tien et al., "J. Electrochem Soc.", vol. 120, No. 2, 1973, pp. 278-281.
Bagdasavov et al., "Soviet Physics Doklady", vol. 19, No. 10, pp. 671-673, 1975.

*Primary Examiner*—Jack Cooper
*Attorney, Agent, or Firm*—Cushman, Darby & Cushman

[57] ABSTRACT

This invention relates to luminescent materials, especially to such materials of the type comprising cerium activated yttrium aluminium garnets which may be used in cathode-ray tubes for flying spot scanning devices.

In more detail the luminescent material of the invention comprises a yttrium-scandium-gallium-aluminium garnet activated by trivalent cerium and having the formula:

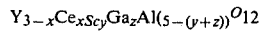

$$Y_{3-x}Ce_xSc_yGa_zAl_{(5-(y+z))}O_{12}$$

in which $0.02 \leq x \leq 0.1$, $0.5 \leq y \leq 2$ and $1 \leq z \leq 3$, provided that $(y+z)$ is less than 5.

9 Claims, No Drawings

LUMINISCENT MATERIALS

This is a continuation-in-part of Ser. No. 007,729, filed Jan. 30, 1979, which is a continuation of Ser. No. 826,749 filed Aug. 22, 1977, both now abandoned.

This invention relates to luminescent materials, especially to such materials of the type comprising cerium-activated yttrium aluminium garnets which may be used in cathode-ray tubes for flying-spot scanning devices.

Luminescent materials, often known as "phosphors" or "phosphor materials", are chemical compounds which, as a result of stimulation or excitation by electromagnetic radiation of a certain wavelength, or by a beam of cathode rays, emit radiation typically in the visible region of the spectrum. The exact chemical nature of a phosphor determines its absorption and emission characteristics and other properties, such as its decay time, by which is meant the time taken for the phosphor to cease to emit radiation after the exciting radiation has ceased, and its efficiency, by which is meant the amount of light emitted relative to the amount of excitation radiation.

The use of flying-spot scanning devices is a well-known technique for reproducing on a television screen images carried on a transparent substrate, for example photographic film. In operation, the substrate is scanned with a light beam from a rapidly-moving light spot on a cathode-ray tube. The transmitted light is converted by means of one or more photocells into an electric signal suitable for television transmission, for example.

In order to achieve accurate reproduction of an image, the light emitted by the phosphor coating on the screen of a cathode-ray tube at any one point, when excited by an electron beam traversing the screen, must have decayed substantially to zero before the beam reaches the next point on the screen, otherwise interference would occur. In practice, the decay time of the phosphor should be less than about $10^{-6}$ seconds when the electron beam moves at the speed standardised for television transmission systems.

A further requirement of a phosphor for use in certain flying-spot cathode ray tubes is that it shall emit light with high efficiency over substantially the entire breadth of the visible spectrum. This is because the light transmitted by the images on the substrate is separated into red, green and blue components and each component is measured by a separate photocell prior to transmission. To achieve faithful colour reproduction, incident radiation strong in red, green and blue components is necessary in order that transmittance of these components shall be sufficiently strong.

Phosphors which have hitherto been used for cathode-ray tubes for flying-spot scanning devices comprise compounds based on yttrium aluminium garnet activated by trivalent cerium. Such compositions are disclosed in British Pat. No. 1,174,518. These materials have a decay time within the required limit but do not emit strongly towards the blue end of the spectrum. Several attempts have been made to overcome this defficiency such as including a further phosphor in the screen which emits predominantly in the blue part of the spectrum. Such attempts have, however, introduced further disadvantages, for example, the working life of the mixed phosphor is limited to that of the shorter-lived of the phosphors in the mixture.

In an attempt to overcome such disadvantages, emission in the blue region can be increased—that is, the wavelength of the emission peak is shortened—by partially substituting gallium for aluminium in the cerium-activated yttrium aluminium garnet phosphor. (See Tien et al: J Electrochem. Soc. Vol. 120, No. 2, (1973), pp 278–281). This has the effect of shifting the emission radiation peak from the yellow or yellow/green region towards the green or blue/green region—which gives adequate relative emission of red, green and blue components—but the overall efficiency of emission falls off with increasing gallium substitution, such that, in the extreme case of total gallium replacement for aluminium, the compound is non-luminescent.

Host materials comprising certain lutetium-, gadolinium-, erbium and yttrium-aluminium-scandium garnets activated by trivalent neodymium, ytterbium, thulium and/or holmium and specifically for use as single crystals in solid state lasers have been reported by Bagdasarov et al in Soviet Physics - Doklady, vol. 19, No. 10, pp 671–673. The authors also report, with no further comment, a new crystal garnet having the formula $Y_3Sc_2Ga_3O_{12}$. The role of the scandium in the host lattice is not clear from the reference, but in general it is true to say that phosphors used in laser applications are necessarily narrow-band emitters.

Surprisingly, we have found that the addition of scandium to a cerium-activated yttrium-gallium-aluminium garnet host material provides a phosphor material capable, under cathode ray excitation, of omitting with high efficiency over a broad wavelength band peaking in the green or blue/green region, that is, between about 500 and 550 nm.

According to the invention, therefore, we provide a luminescent material comprising an yttrium-scandium-gallium-aluminium garnet activated by trivalent cerium and having the formula

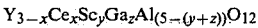

$$Y_{3-x}Ce_xSc_yGa_zAl_{(5-(y+z))}O_{12}$$

in which $0.02 \leq x \leq 0.1$, $0.5 \leq y \leq 2$ and $1 \leq z \leq 3$, provided that $(y+z)$ is always less than 5.

The lower limit on the concentration of activator (that is, the value of x) is determined by emission performance. We have found that, for values of x less than about 0.02, fluorescence efficiency is severely impaired. The upper limit, on the other hand, is determined by the ionic size of $Ce^{3+}$ which is such, compared with that of $Y^{3+}$, that a non-homogeneous composition result from a concentration of $Ce^{3+}$ greater than that represented by $x=0.1$. The range of x which we prefer is 0.05–0.1, for example 0.08.

When excited by a cathode ray beam, phosphors according to the invention emit a broad band of visible light peaking in the green or blue/green region of the spectrum between about 500 and 550 nm and have a decay time of less than $10^{-6}$ seconds. They may conveniently be prepared by the co-precipitation technique, as illustrated by the following Examples, although other methods may be used.

EXAMPLE 1

18.66 g of yttrium oxide and 5.80 g of scandium oxide were dissolved in about 100 ml of moderately concentrated (approx 50%) nitric acid. The solution was combined with solutions of aluminium nitrate, gallium nitrate and cerium nitrate containing respectively 1.51 g of aluminium, 9.77 g of gallium and 0.628 g of cerium. This combined solution was added slowly to about 1 l of water which was stirred continuously, while simultaneously adding dilute ammonium hydroxide solution sufficient to maintain the reaction mixture at a pH of about 7.5–8. When the resultant precipitation was complete, the precipitate was allowed to digest and was then filtered off, washed and oven dried. After crushing to a uniform powder, this was fired at 1200° C. in air for about 1 hour, crushed again and refired at 1550° C. in air for about 3 hours to give a luminescent material according to the invention with a composition of $Y_{2.92}Ce_{0.08}Sc_{1.5}Ga_{2.5}AlO_{12}$ (i.e., x=0.08, y=1.5, z=2.5).

EXAMPLE 2

The method of Example 1 was followed using the following quantities of materials:

| Yttrium oxide | | 25.52 g |
| --- | --- | --- |
| Scandium oxide | | 3.95 g |
| Nitric acid | | 160. ml |
| Aluminium | as | 6.70 g |
| Gallium | nitrates | 5.33 g |
| Cerium | | 0.087 g |

The resulting phospor had the formula $Y_{2.92}Ce_{0.08}Sc_{0.75}GaAl_{3.25}O_{12}$ (i.e., x=0.08, y=0.75, z=1).

EXAMPLE 3

The method of Example 1 was repeated using the following quantities of materials:

| Yttrium oxide | | 3.545 g |
| --- | --- | --- |
| Scandium oxide | | 0.741 g |
| Nitric acid | | 25. ml |
| Aluminum | as | 0.290 g |
| Gallium | nitrates | 2.250 g |
| Cerium | | 0.120 g |

The resulting phosphor had the formula $Y_{2.92}Ce_{0.08}ScGa_3AlO_{12}$ (i.e., x=0.08, y=1, z=3).

EXAMPLE 4

The method of Example 1 was repeated using the following quantities of materials:

| Yttrium oxide | | 3.670 g |
| --- | --- | --- |
| Scandium oxide | | 1.535 g |
| Nitric acid | | 30. ml |
| Aluminium | as | 0.300 g |
| Gallium | nitrates | 1.550 g |
| Cerium | | 0.124 g |

The resulting phosphor had the formula $Y_{2.92}Ce_{0.08}Sc_2Ga_2AlO_{12}$ (i.e., x=0.08, y=2, z=2).

EXAMPLE 5

The method of Example 1 was repeated using the following quantities of materials:

| Yttrium Oxide | | 4.965 g |
| --- | --- | --- |
| Scandium Oxide | | 0.514 g |
| Nitric Acid | | 30. ml |
| Aluminium | as | 1.205 g |
| Gallium | nitrates | 1.560 g |
| Cerium | | 0.167 g |

The resulting phosphor had the formula $Y_{2.92}Ce_{0.08}Sc_{0.5}Ga_{1.5}Al_3O_{12}$ (i.e., x=0.08, y=0.5, z=1.5).

The co-precipitation technique, as exemplified above, results in phosphors in substantially quantitative yields, and is hence a reproducible preparative technique.

On excitation by a cathode ray beam, examples of phosphors according to the invention emitted a broad band of visible light, peaking as follows:

| | |
| --- | --- |
| $Y_{2.92}Ce_{0.08}Sc_2Ga_2AlO_{12}$ | (i.e., x = 0.08, y = 2, z = 2) |
| Peaked at 517 nm | |
| $Y_{2.92}Ce_{0.08}Sc_2GaAl_2O_{12}$ | (i.e., x = 0.08, y = 2, z = 1) |
| peaked at 527 nm | |

The following figures show the effect on brightness (that is, efficiency of emission) of adding scandium to a yttrium-gallium-aluminium host material activated with trivalent cerium. The figures are in arbitrary units for a constant level of cathode ray excitation.

| | |
| --- | --- |
| $Y_3Ga_4AlO_{12}$ : 0.08Ce | 10 |
| (x = 0.08, y = 0, z = 4; prior art example). | |
| $Y_3ScGa_3AlO_{12}$ : 0.08Ce | 85 |
| (x = 0.08, y = 1, z = 3; phosphor according to the invention) | |
| $Y_3Sc_2Ga_2AlO_{12}$ : 0.08Ce | 245 |
| (x = 0.08, y = 2, z = 2; phosphor according to the invention) | |

I claim:

1. A luminescent material comprising an yttrium-scandium-gallium-aluminum garnet activated by trivalent cerium and having the formula:

$$Y_{3-x}Ce_xSc_yGa_zAl_{(5-(y+z))}O_{12}$$

in which $0.02 \leq x \leq 0.1$, $0.5 \leq y \leq 2$ and $1 \leq z \leq 3$, provided that (y+z) is less than 5, said material being capable, under cathode ray excitation, of emitting with high efficiency over a broad wavelength band peaking in the green or blue/green region between about 500 and 550 nm and having a decay time of less than $10^{-6}$ seconds, said material exhibiting brighter luminescense on cathode ray excitation than the corresponding yttrium-gallium-aluminum garnet activated by trivalent cerium in which the scandium is replaced by gallium.

2. A luminescent material as claimed in claim 1, in which $0.05 \leq x \leq 0.1$.

3. A luminescent material as claimed in claim 1, in which x=0.08.

4. A luminescent material according to claim 1 having the formula:

$Y_{2.92}Ce_{0.08}Sc_{1.5}Ga_{2.5}AlO_{12}$

5. A luminescent material according to claim 1 having the formula:

$Y_{2.92}Ce_{0.08}Sc_{0.75}GaAl_{3.25}O_{12}$

6. A luminescent material according to claim 1 having the formula:

$Y_{2.92}Ce_{0.08}ScGa_3AlO_{12}$

7. A luminescent material according to claim 1 having the formula:

$Y_{2.92}Ce_{0.08}Sc_2Ga_2AlO_{12}$ said material emitting a band peaking at 517 nm.

8. A luminescent material according to claim 1 having the formula:

$$Y_{2.92}Ce_{0.08}Sc_{0.5}Ga_{1.5}Al_3O_{12}$$

9. A luminescent material according to claim 1 having the formula:

$$Y_{2.92}Ce_{0.08}Sc_2GaAl_2O_{12},$$

said material emitting a band peaking at 527 nm.

* * * * *

UNITED STATES PATENT AND TRADEMARK OFFICE
CERTIFICATE OF CORRECTION

PATENT NO. : 4,314,910
DATED : February 9, 1982
INVENTOR(S) : Roderick G.L. Barnes It is certified that error appears in the above—identified patent and that said Letters Patent are hereby corrected as shown below:

On the front page of the patent, correct as follows:

--[22] Filed: February 20, 1980-- instead of "Jan. 20, 1980"

Signed and Sealed this

Thirtieth Day of November 1982

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,314,910

DATED : February 9, 1982

INVENTOR(S) : Roderick G.L. Barnes

It is certified that error appears in the above-identified patent and that said Letters Patent are hereby corrected as shown below:

On the front page of the patent, add:

-- [73] Assignee: Johnson Matthey Public Limited Company, London, England --.

Signed and Sealed this

Ninth Day of August 1983

[SEAL]

Attest:

GERALD J. MOSSINGHOFF

Attesting Officer       Commissioner of Patents and Trademarks